(12) United States Patent
Guo et al.

(10) Patent No.: US 12,471,035 B2
(45) Date of Patent: Nov. 11, 2025

(54) TRANSMIT POWER ADJUSTMENT FOR A VEHICLE WITH MULTIPLE TRANSMISSION AND RECEPTION POINTS

(71) Applicant: QUALCOMM Incorporated, San Diego, CA (US)

(72) Inventors: Hui Guo, Beijing (CN); Kapil Gulati, Belle Mead, NJ (US); Junyi Li, Fairless Hills, PA (US); Shuanshuan Wu, San Diego, CA (US); Sourjya Dutta, San Diego, CA (US)

( * ) Notice: Subject to any disclaimer, the term of this patent is extended or adjusted under 35 U.S.C. 154(b) by 507 days.

(21) Appl. No.: 17/997,695

(22) PCT Filed: Jul. 3, 2020

(86) PCT No.: PCT/CN2020/100109
§ 371 (c)(1),
(2) Date: Nov. 1, 2022

(87) PCT Pub. No.: WO2022/000459
PCT Pub. Date: Jan. 6, 2022

(65) Prior Publication Data
US 2023/0224822 A1    Jul. 13, 2023

(51) Int. Cl.
*H04W 52/24* (2009.01)
(52) U.S. Cl.
CPC ................. *H04W 52/245* (2013.01)
(58) Field of Classification Search
CPC .. H04W 52/24; H04W 52/245; H04L 1/0026; H04L 1/0029
See application file for complete search history.

(56) References Cited

U.S. PATENT DOCUMENTS

| | | | |
|---|---|---|---|
| 7,702,029 B2* | 4/2010 | Kotecha | H04B 7/0447 375/267 |
| 10,299,227 B2* | 5/2019 | Cai | H04B 7/0426 |

(Continued)

FOREIGN PATENT DOCUMENTS

| | | |
|---|---|---|
| CN | 103004103 A | 3/2013 |
| CN | 105306178 A | 2/2016 |
| WO | WO-2020032657 A1 | 2/2020 |

OTHER PUBLICATIONS

3GPP : "3rd Generation Partnership Project, Technical Specification Group Radio Access Network, Evolved Universal Terrestrial Radio Access (E-UTRA), Physical layer procedures (Release 14)", TS 36.213 V14.16.0, Sep. 2020, 469 Pages.

(Continued)

*Primary Examiner* — Hai V Nguyen

(57) ABSTRACT

In some aspects of the disclosure, a method of wireless communication includes performing a first wireless transmission using a plurality of transmission and reception points (TRPs) of a vehicle. The first wireless transmission is performed based on a first transmit power allocation among the plurality of TRPs. The method further includes, in response to the first wireless transmission, receiving one or more feedback signals indicating a receive status of the first wireless transmission at one or more devices. The method further includes performing a second wireless transmission using the plurality of TRPs based on a second transmit power allocation among the plurality of TRPs. The second transmit power allocation is determined based on at least one received signal strength of the one or more feedback signals.

35 Claims, 6 Drawing Sheets

(56) References Cited

U.S. PATENT DOCUMENTS

| | | | | |
|---|---|---|---|---|
| 10,581,722 | B2* | 3/2020 | Luo | H04W 52/42 |
| 10,680,760 | B2* | 6/2020 | Chae | H04W 28/04 |
| 11,349,610 | B2* | 5/2022 | Chae | H04W 72/02 |
| 11,653,312 | B1* | 5/2023 | Abotabl | H04W 52/38 455/522 |
| 11,700,601 | B2* | 7/2023 | Lee | H04W 52/367 370/329 |
| 11,716,179 | B2* | 8/2023 | Eldessoki | H04L 27/2604 370/329 |
| 11,765,070 | B2* | 9/2023 | Luo | H04W 72/54 455/226.1 |
| 11,778,611 | B2* | 10/2023 | Kang | H04L 5/0053 370/329 |
| 11,832,291 | B2* | 11/2023 | Li | H04W 72/1263 |
| 11,864,129 | B2* | 1/2024 | Raghavan | H04W 52/245 |
| 11,889,541 | B2* | 1/2024 | Balasubramanian | H04W 52/24 |
| 11,894,888 | B2* | 2/2024 | Ryu | H04W 72/02 |
| 11,991,641 | B2* | 5/2024 | Xue | H04W 72/21 |
| 12,081,290 | B2* | 9/2024 | Miao | H04B 7/024 |
| 12,120,661 | B2* | 10/2024 | He | H04W 72/0446 |
| 12,143,322 | B2* | 11/2024 | Eldessoki | H04L 5/0037 |
| 12,167,384 | B2* | 12/2024 | Wang | H04W 16/28 |
| 12,323,344 | B2* | 6/2025 | Khoshnevisan | H04L 5/0032 |
| 2014/0140433 | A1* | 5/2014 | Cai | H04B 7/0426 375/295 |
| 2018/0054783 | A1* | 2/2018 | Luo | H04W 52/146 |
| 2019/0052411 | A1* | 2/2019 | Chae | H04W 52/242 |
| 2019/0098585 | A1 | 3/2019 | Golitschek Edler Von Elbwart et al. | |
| 2019/0123864 | A1* | 4/2019 | Zhang | H04L 5/005 |
| 2019/0261278 | A1 | 8/2019 | Gupta et al. | |
| 2020/0059867 | A1* | 2/2020 | Haghighat | H04W 52/367 |
| 2020/0195397 | A1 | 6/2020 | John Wilson et al. | |
| 2020/0313801 | A1* | 10/2020 | Chae | H04L 1/1854 |
| 2020/0314819 | A1* | 10/2020 | Loehr | H04W 4/40 |
| 2020/0351827 | A1* | 11/2020 | Chae | H04L 5/001 |
| 2020/0351833 | A1* | 11/2020 | Chae | H04W 72/04 |
| 2021/0036818 | A1* | 2/2021 | Eldessoki | H04J 11/0053 |
| 2021/0051510 | A1* | 2/2021 | Chae | H04B 17/318 |
| 2021/0051673 | A1* | 2/2021 | Chae | H04W 72/23 |
| 2021/0092759 | A1* | 3/2021 | Xiong | H04W 72/0446 |
| 2021/0218500 | A1* | 7/2021 | Bhamri | H04W 72/21 |
| 2021/0282143 | A1* | 9/2021 | Lee | H04W 52/343 |
| 2021/0377989 | A1* | 12/2021 | Chae | H04L 1/1861 |
| 2021/0392652 | A1* | 12/2021 | Dutta | H04W 72/542 |
| 2022/0173854 | A1* | 6/2022 | Chae | H04L 1/1896 |
| 2022/0182208 | A1* | 6/2022 | Yu | H04L 5/0053 |
| 2022/0201757 | A1* | 6/2022 | Cruz | H04L 1/1896 |
| 2022/0303812 | A1* | 9/2022 | Chung | H04L 5/0094 |
| 2022/0312334 | A1* | 9/2022 | Gao | H04L 1/0003 |
| 2022/0312342 | A1* | 9/2022 | Cha | H04L 5/0053 |
| 2022/0369187 | A1* | 11/2022 | Ganesan | H04W 36/06 |
| 2022/0377649 | A1* | 11/2022 | Choi | H04W 48/12 |
| 2022/0377810 | A1* | 11/2022 | Bhamri | H04B 7/0695 |
| 2023/0022915 | A1* | 1/2023 | Bhamri | H04B 7/0408 |
| 2023/0077779 | A1* | 3/2023 | Basu Mallick | H04L 1/1825 370/329 |
| 2023/0078181 | A1* | 3/2023 | Ghanbarinejad | H04W 52/325 370/318 |
| 2023/0080162 | A1* | 3/2023 | Ghanbarinejad | H04W 52/46 455/522 |
| 2023/0084239 | A1* | 3/2023 | Cha | H04W 52/245 455/522 |
| 2023/0100135 | A1* | 3/2023 | Liu | H04W 24/08 370/252 |
| 2023/0127256 | A1* | 4/2023 | Cha | H04W 52/242 370/318 |
| 2023/0179281 | A1* | 6/2023 | Svedman | H04B 7/0695 455/101 |
| 2023/0189240 | A1* | 6/2023 | Gulati | H04W 52/285 370/329 |
| 2023/0209370 | A1* | 6/2023 | Pateromichelakis | G06N 20/00 370/328 |
| 2023/0216627 | A1* | 7/2023 | Wang | H04B 7/063 370/329 |
| 2023/0224822 | A1* | 7/2023 | Guo | H04W 52/48 455/522 |
| 2023/0353296 | A1* | 11/2023 | Eldessoki | H04J 11/0053 |
| 2024/0251359 | A1* | 7/2024 | Zorgui | H04W 92/18 |
| 2024/0306168 | A1* | 9/2024 | Zhou | H04W 72/232 |
| 2025/0212137 | A1* | 6/2025 | Kang | H04W 52/367 |
| 2025/0219704 | A1* | 7/2025 | Marinier | H04W 52/52 |

OTHER PUBLICATIONS

Supplementary European Search Report—EP20942824—Search Authority—The Hague—Mar. 1, 2024 (205542EP).
International Search Report and Written Opinion—PCT/CN2020/100109—ISA/EPO—Mar. 30, 2021 (205542WO1).

* cited by examiner

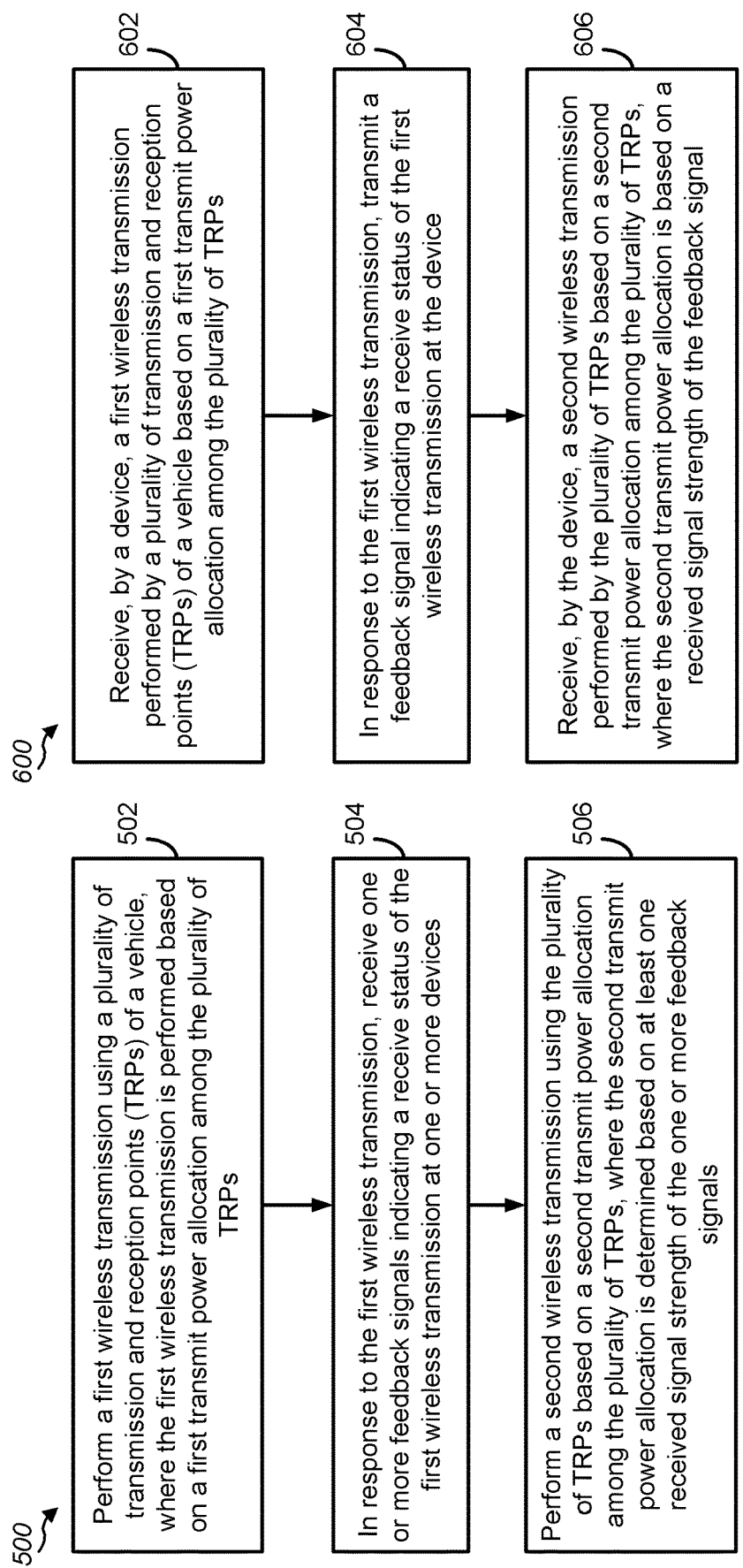

TRANSMIT POWER ADJUSTMENT FOR A VEHICLE WITH MULTIPLE TRANSMISSION AND RECEPTION POINTS

CROSS-REFERENCE TO RELATED APPLICATIONS

This application claims the benefit of International Patent Application No. PCT/CN2020/100109, entitled, "TRANSMIT POWER ADJUSTMENT FOR A VEHICLE WITH MULTIPLE TRANSMISSION AND RECEPTION POINTS," filed on Jul. 3, 2020, which is expressly incorporated by reference herein in its entirety.

TECHNICAL FIELD

Aspects of the present disclosure relate generally to wireless communication systems, and more particularly, to vehicles that use transmission and reception points (TRPs) to transmit signals within a wireless communication system.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication includes performing a first wireless transmission using a plurality of transmission and reception points (TRPs) of a vehicle. The first wireless transmission is performed based on a first transmit power allocation among the plurality of TRPs. The method further includes, in response to the first wireless transmission, receiving one or more feedback signals indicating a receive status of the first wireless transmission atone or more devices. The method further includes performing a second wireless transmission using the plurality of TRPs based on a second transmit power allocation among the plurality of TRPs. The second transmit power allocation is determined based on at least one received signal strength of the one or more feedback signals.

In some other aspects, an apparatus includes a memory and one or more processors coupled to the memory. The one or more processors are configured to perform a first wireless transmission using a plurality of TRPs of a vehicle based on a first transmit power allocation among the plurality of TRPs. The one or more processors are further configured to receive, in response to the first wireless transmission, one or more feedback signals indicating a receive status of the first wireless transmission at one or more devices. The one or more processors are further configured to perform a second wireless transmission using the plurality of TRPs based on a second transmit power allocation among the plurality of TRPs. The second transmit power allocation is determined based on at least one received signal strength of the one or more feedback signals.

In some other aspects, an apparatus includes means for performing a first wireless transmission using a plurality of TRPs of a vehicle. The first wireless transmission is performed based on a first transmit power allocation among the plurality of TRPs. The apparatus further includes means for receiving, in response to the first wireless transmission, one or more feedback signals indicating a receive status of the first wireless transmission at one or more devices. The apparatus further includes means for performing a second wireless transmission using the plurality of TRPs based on a second transmit power allocation among the plurality of TRPs, wherein the second transmit power allocation is determined based on at least one received signal strength of the one or more feedback signals.

In some other aspects, a non-transitory computer-readable medium stores instructions executable by a processor to perform operations. The operations include performing a first wireless transmission using a plurality of TRPs of a vehicle. The first wireless transmission is performed based on a first transmit power allocation among the plurality of TRPs. The operations further include, in response to the first wireless transmission, receiving one or more feedback signals indicating a receive status of the first wireless transmission at one or more devices. The operations further include performing a second wireless transmission using the plurality of TRPs based on a second transmit power allocation among the plurality of TRPs. The second transmit power allocation is determined based on at least one received signal strength of the one or more feedback signals.

In some other aspects, a method of wireless communication includes receiving, by a device, a first wireless transmission performed by a plurality of TRPs of a vehicle based on a first transmit power allocation among the plurality of TRPs. The method further includes, in response to the first wireless transmission, transmitting a feedback signal indicating a receive status of the first wireless transmission at the device. The method further includes receiving, by the device, a second wireless transmission performed by the plurality of TRPs based on a second transmit power allocation among the plurality of TRPs. The second transmit power allocation is based on a received signal strength of the feedback signal.

In some other aspects, an apparatus includes a memory and one or more processors coupled to the memory. The one or more processors are configured to receive a first wireless transmission performed by a plurality of TRPs of a vehicle based on a first transmit power allocation among the plurality of TRPs. The one or more processors are further configured to transmit, in response to the first wireless transmission, a feedback signal indicating a receive status of the first wireless transmission. The one or more processors are further configured to receive a second wireless transmission performed by the plurality of TRPs based on a second transmit power allocation among the plurality of TRPs. The second transmit power allocation is based on a received signal strength of the feedback signal.

In some other aspects, an apparatus includes means for receiving a first wireless transmission performed by a plurality of TRPs of a vehicle based on a first transmit power allocation among the plurality of TRPs. The apparatus further includes means for transmitting, in response to the first wireless transmission, a feedback signal indicating a receive status of the first wireless transmission. The apparatus further includes means for receiving a second wireless transmission performed by the plurality of TRPs based on a second transmit power allocation among the plurality of TRPs. The second transmit power allocation is based on a received signal strength of the feedback signal.

In some other aspects, a non-transitory computer-readable medium stores instructions executable by a processor to perform operations. The operations include receiving, by a device, a first wireless transmission performed by a plurality of TRPs of a vehicle based on a first transmit power allocation among the plurality of TRPs. The operations further include, in response to the first wireless transmission, transmitting a feedback signal indicating a receive status of the first wireless transmission at the device. The operations also include receiving, by the device, a second wireless transmission performed by the plurality of TRPs based on a second transmit power allocation among the plurality of TRPs. The second transmit power allocation is based on a received signal strength of the feedback signal.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a flow chart of a method of wireless communication in accordance with some aspects of the disclosure.

FIG. 6 is a flow chart of another method of wireless communication in accordance with some aspects of the disclosure.

Figure 1:
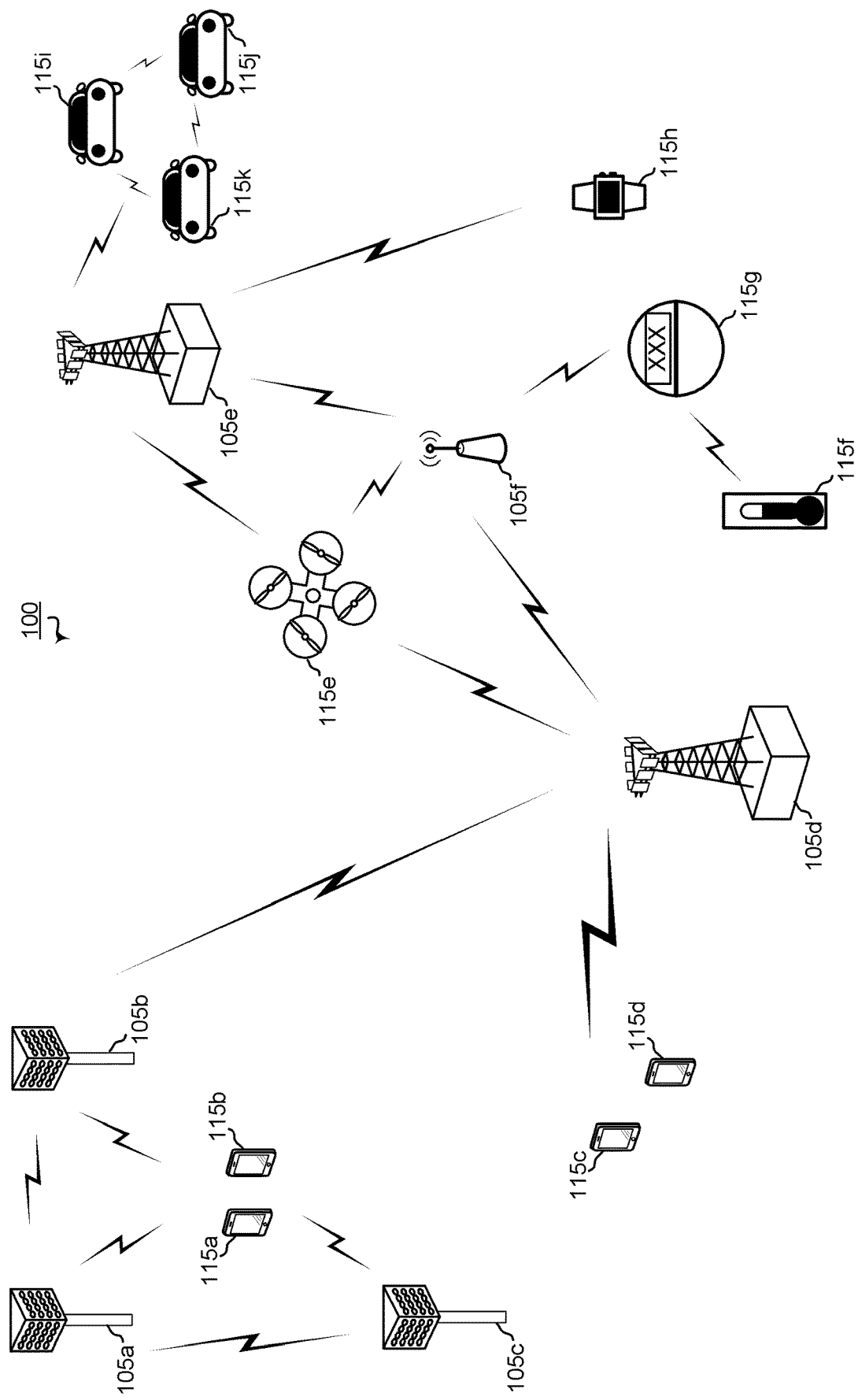
FIG. 1 is a block diagram illustrating an example of a wireless communication system according to some aspects of the disclosure.

The Appendix provides further details regarding various aspects of this disclosure and the subject matter therein forms a part of the specification of this application.

DETAILED DESCRIPTION

Vehicles increasingly use wireless communications to transmit and receive data. For example, a vehicle may use a "vehicle-to-everything" (V2X) wireless communication protocol to transmit and receive vehicle safety information, such as to indicate an approaching emergency vehicle or to provide a collision warning, as illustrative examples. One particular type of V2X wireless communication protocol is a cellular V2X (C-V2X) communication protocol that uses cellular communications between a user equipment (UE) (e.g., a vehicle) and other devices, such as other vehicles, pedestrian devices, roadside units (RSUs), and other devices. Thus, V2X and C-V2X communication techniques have capability to significantly increase road safety.

To enable communications between vehicles and other devices, a vehicle may reserve resources of a wireless communication channel using one or more techniques to avoid resource conflict with other transmitting devices. To illustrate, after reserving the resources, the vehicle may transmit a wireless communication signal using the resources, and other devices may refrain from using the resources while the reservation is valid (e.g., until the reservation "expires"). In some wireless communication protocols, the vehicle also indicates a transmit power setting, such as a transmission configuration indicator (TCI) state, while reserving the resources.

In some wireless communication protocols, the vehicle may use the same transmit power setting for communications performed during the reservation. For example, the transmit power may be based on a reference signal (such as a demodulation reference signal (DMRS)), and the vehicle may receive one reference signal per reservation. As a result, the vehicle may be unable to change the transmit power setting during the reservation. In some cases, changing the transmit power setting during the reservation may be advantageous, such as if the vehicle moves away from a receiver device after making the reservation and prior to expiration of the reservation.

A technique in accordance with some aspects of the disclosure uses a received signal strength of a feedback signal to adjust a transmit power setting of a vehicle. The transmit power setting may correspond to an allocation of power among transmission and reception points (TRPs) of the vehicle. To illustrate, a first wireless transmission performed by the vehicle may include a reservation of one or more time-frequency resources and may be performed based on a first transmit power allocation (e.g., a first TCI state) among the TRPs (e.g., where one TRP is allocated fifty percent of a total transmit power, and where another TRP is allocated fifty percent of the total transmit power). The vehicle may receive one or more feedback signals from one or more devices, such as by receiving an acknowledgement (ACK) of the first wireless transmission, a negative acknowledgement (NACK) of the first wireless transmission, or both.

The vehicle may determine a received signal strength of the one or more feedback signals. For example, the received signal strength may correspond to a reference signal strength indicator (RSSI) of the one or more feedback signals or a reference signal received power (RSRP) of the one or more feedback signals. The vehicle may determine a second transmit power allocation (e.g., a second TCI state) among the TRPs for a second wireless transmission. In one example, if a received signal strength of a feedback signal received by a TRP is relatively low, the vehicle may determine that a receiver device transmitting the feedback signal is relatively far from the vehicle and may adjust (e.g., increase) transmit power allocated to the TRP (e.g., to increase probability of the receiver device receiving the second wireless transmission). Alternatively or in addition, if a received signal strength of a feedback signal received by a TRP is relatively high, the vehicle may determine that a receiver device transmitting the feedback signal is relatively near to the vehicle and may adjust (e.g., decrease) transmit power allocated to the TRP.

By adjusting a transmit power allocation among TRPs prior to expiration of a reservation of time-frequency resources, a vehicle can increase transmit signal coverage (e.g., to enable 360 degree coverage associated with transmit signals). As a result, quality of wireless communication can be improved as compared to other techniques, such as techniques that maintain a same transmit power setting during a reservation.

To further illustrate, this disclosure relates generally to wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, examples and/or uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described examples. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
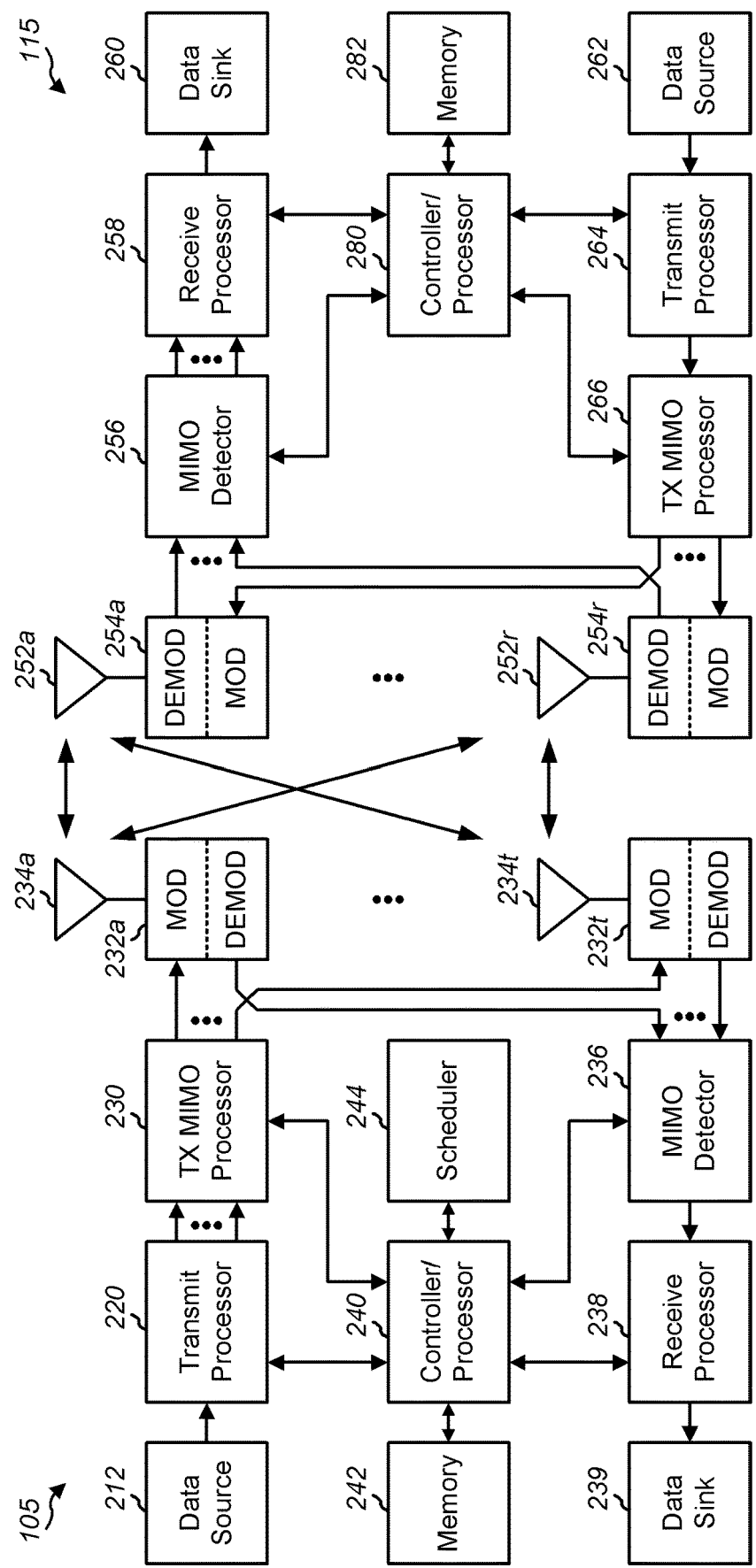
FIG. 2 is a block diagram illustrating examples of a base station and a UE according to some aspects of the disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as one or more operations of FIG. 5, one or more operations of FIG. 6, or a combination thereof. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available.

In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
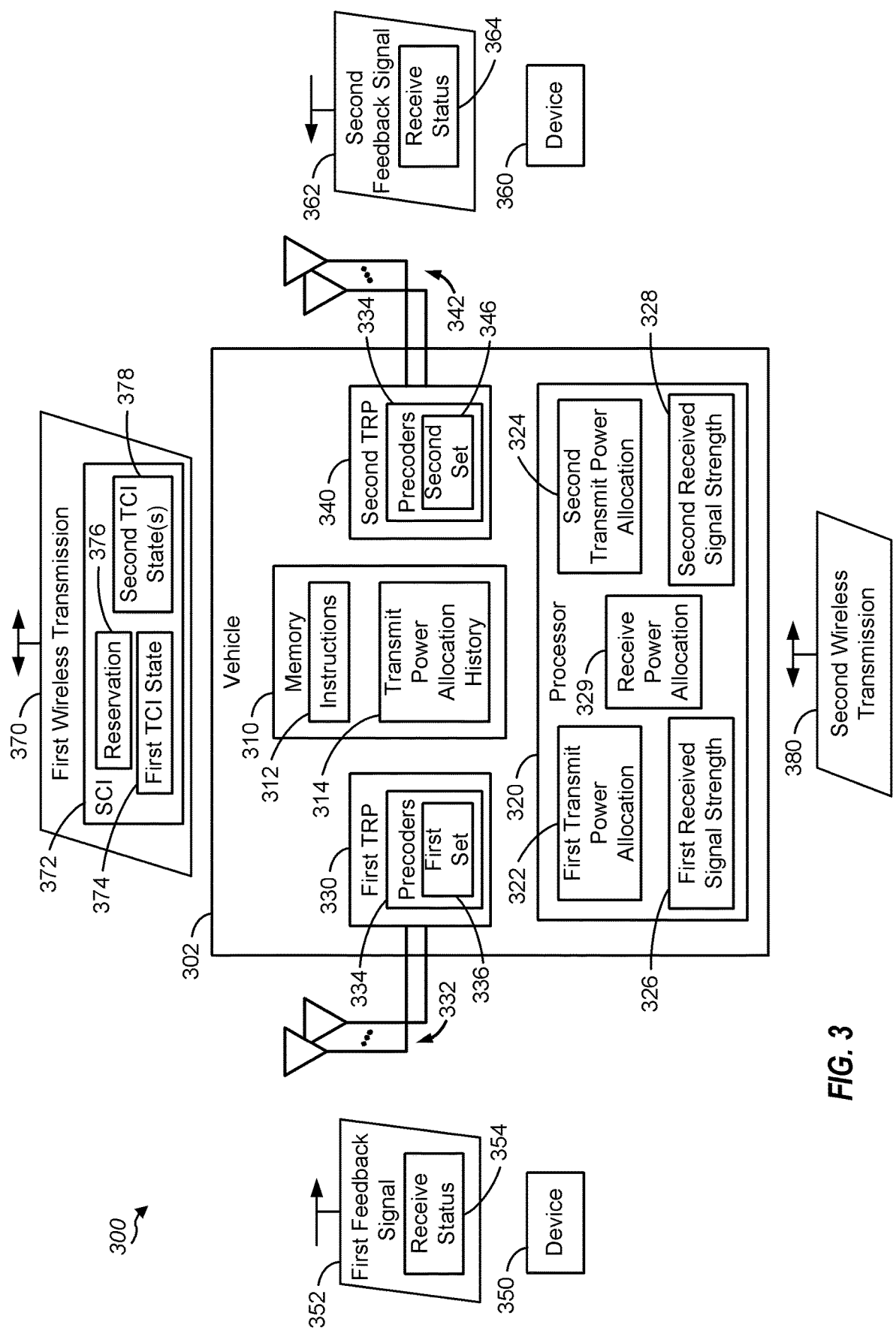
FIG. 3 is a block diagram illustrating another example of a wireless communication system according to some aspects of the disclosure.

FIG. 3 illustrates another example of a wireless communication system 300 in accordance with some aspects of the disclosure. The wireless communication system 300 includes a vehicle 302. In some examples, the vehicle 302 corresponds to a UE, such as one of the UEs 115k-i of FIG. 1.

The vehicle 302 includes a memory 310 and one or more processors coupled to the memory 310, such as a processor 320. The processor 320 may access instructions 312 stored at the memory 310 and may execute the instructions 312 to perform one or more operations described herein. The vehicle 302 further includes multiple transmission and reception points (TRPs), such as a first TRP 330 and a second TRP 340. Although the example of FIG. 3 illustrates that the vehicle 302 may include two TRPs 330, 340, in other examples, the vehicle 302 may include a different number of TRPs.

TRPs of the vehicle 302 may be positioned to increase wireless coverage associated with the vehicle 302 (e.g., to enable 360 degree wireless coverage). To illustrate, in some implementations, the first TRP 330 is positioned at a first region of the vehicle 302, and the second TRP 340 is positioned at a second region of the vehicle 302 that is different than the first region. In some examples, the first region corresponds to one of a front of the vehicle 302, a back of the vehicle 302, a driver side of the vehicle 302, or a passenger side of the vehicle 302, and the second region corresponds to another of the front of the vehicle 302, the back of the vehicle 302, the driver side of the vehicle 302, or the passenger side of the vehicle 302.

A TRP of the vehicle 302 may be coupled to or may include one or more antennas or antenna panels. To illustrate, in some examples, the first TRP 330 includes or is coupled to a first antenna device 332 (e.g., one or more antennas or antenna panels), and the second TRP 340 includes or is coupled to a second antenna device 342 (e.g., one or more antennas or antenna panels).

In some examples, the vehicle 302 includes one or more features described with reference to the UE 115 of FIG. 2. For example, the antenna devices 332, 342 may include or correspond to any of the antennas 252a-r of FIG. 2. In some examples, the TRPs 330, 340 may include any of the modulators and demodulators 254a-r, the MIMO detector 256, the receive processor 258, the data sink 260, the data source 262, the transmit processor 264, and the TX MIMO processor 266. The processor 320 may correspond to the controller/processor 280, and the memory 310 may correspond to the memory 310.

The vehicle 302 is configured to wirelessly communicate with one or more devices. For example, the vehicle 302 may wirelessly transmit and receive data associated with operation of the vehicle 302 (e.g., direction, velocity, acceleration, or other vehicle operation data), sensor data (e.g., traffic density, traffic patterns, or other sensor data), other data, or a combination thereof. In some examples, the vehicle 302 includes an on-board unit (OBU) device that wirelessly communicates with other devices, such as roadside unit (RSU) devices. In some examples, a RSU device may include or correspond to the base station 105 described with reference to FIGS. 1 and 2. In some implementations, an RSU device may be attached to or integrated within an infrastructure component, such as a mounting device (e.g., a pole, a wire, a post, or a bracket) of a traffic sign or traffic signal, as illustrative examples. In some other implementations, an RSU device is attached to or integrated within a "standalone" component, such as a radio tower.

In some examples, the vehicle 302 corresponds to a motor vehicle, such as a car, a truck, a bus, a motorcycle, or another type of motor vehicle. In some other examples, the vehicle 302 may correspond to another vehicle, such as another type of terrestrial vehicle (e.g., a bicycle), an aircraft, a watercraft, an amphibious vehicle, a rail transport vehicle, or a spacecraft, as illustrative examples. Depending on the implementation, the vehicle 302 may correspond to an autonomous vehicle, a non-autonomous vehicle, or a semi-autonomous vehicle (e.g., a vehicle that includes one or more autonomous vehicle systems and one or more non-autonomous vehicle systems).

In some examples, the vehicle 302 is configured perform vehicle-to-everything (V2E) communication, such as cellular V2E (C-V2E) communication. To illustrate, the vehicle 302 may be configured to communicate with other vehicles using vehicle-to-vehicle (V2V) communication, to communicate with road infrastructure devices (e.g., an RSU device) using vehicle-to-infrastructure (V2I) communication, to communicate with pedestrian devices using vehicle-to-pedestrian (V2P) communication, to communicate with cloud devices using vehicle-to-cloud (V2C) communication, or a combination thereof. Further, the vehicle 302 may be configured to use wireless communications in connection with one or more of V2V communication, V2I communication, V2P communication, or V2C communication.

To further illustrate, in the example of FIG. 3, the vehicle 302 may wireless communicate with a device 350 and a device 360. In one example, one or both of the devices 350, 360 are included in or correspond to a second vehicle. In some other examples, one or both of the devices may correspond to an infrastructure device (e.g., an RSU device), a pedestrian device, a cloud device, or another device.

During operation, the vehicle 302 may perform a first wireless transmission 370. In some examples, the first wireless transmission 370 includes data associated with operation of the vehicle 302 (e.g., direction, velocity, acceleration, or other vehicle operation data), sensor data (e.g., traffic density, traffic patterns, or other sensor data), other data, or a combination thereof. In some examples, the vehicle 302 performs the first wireless transmission 370 via a sidelink of a vehicle-to-vehicle wireless communications network.

The vehicle 302 may perform the first wireless transmission 370 using multiple TRPs, such as the TRPs 330, 340. Use of multiple TRPs of the vehicle 302 to perform the first wireless transmission 370 may increase likelihood that one or more devices receive the first wireless transmission 370. To illustrate, in FIG. 3, use of the first TRP 330 may increase likelihood that the first wireless transmission 370 is received by the device 350 (if the device 350 is nearer to the first TRP 330 than to the second TRP 340), and use of the second TRP 340 may increase likelihood that the first wireless transmission 370 is received by the device 360 (if the device 360 is nearer to the second TRP 340 than to the first TRP 330).

The vehicle 302 may perform the first wireless transmission 370 based on a first transmit power allocation 322 among the TRPs 330, 340. To illustrate, in one example, the first transmit power allocation 322 corresponds to a default power allocation, such as a balanced transmit power allocation 322 among the TRPs 330, 340 (e.g., where approximately fifty percent of a total transmit power is allocated to the first TRP 330, and where approximately fifty percent of the total transmit power is allocated to the second TRP 340).

One or more devices of the wireless communication system 300 may receive the first wireless transmission 370. For example, the device 350 may receive the first wireless transmission 370. Alternatively or in addition, the device 360 may receive the first wireless transmission 370. A device that receives the first wireless transmission 370 (or at least a portion of the first wireless transmission 370) may generate a feedback signal based on the first wireless transmission 370. To illustrate, the device 350 may generate a first feedback signal 352 based on the first wireless transmission 370. As another example, the device 350 may generate a second feedback signal 362 based on the first wireless transmission 370.

A feedback signal may indicate a receive status (e.g., pass or fail) associated with reception of the first wireless transmission 370. To illustrate, the first feedback signal 352 may indicate a receive status of the first wireless transmission 370 at the device 350. In some examples, in response to the device 350 successfully receiving and decoding the first wireless transmission 370, the receive status 354 may indicate a success status. For example, the receive status may indicate an acknowledgement (ACK) of the first wireless transmission 370 by the device 350. Alternatively, in response to the device 350 failing to receive and decode the first wireless transmission 370, the receive status 354 may indicate a failure status, such as an acknowledgement (ACK) of the first wireless transmission 370 by the device 350.

To further illustrate, the second feedback signal 362 may indicate a receive status of the first wireless transmission 370 at the device 350. In some examples, in response to the device 350 successfully receiving and decoding the first wireless transmission 370, the receive status 354 may indicate a success status. For example, the receive status may indicate a negative-acknowledgement (NACK) of the first wireless transmission 370 by the device 350. Similarly, the second feedback signal 362 may indicate a receive status 364 (e.g., an ACK or a NACK) of the first wireless transmission 370 at the device 360.

The vehicle 302 may receive the one or more feedback signals. For example, the vehicle 302 may receive the first feedback signal 352 using the first TRP 330, using the second TRP 340, or both. As another example, the vehicle 302 may receive the second feedback signal 362 using the first TRP 330, using the second TRP 340, or both.

The vehicle 302 may determine a second transmit power allocation 324 based on the one or more feedback signals. The second transmit power allocation 324 may be based on a first received signal strength 326 that is determined based on one or more feedback signals detected by the first TRP 330 (e.g., the first feedback signal 352, the second feedback signal 362, or both). Alternatively or in addition, the second transmit power allocation 324 may be determined based on a second received signal strength 328 that is determined based on one or more feedback signals detected by the second TRP 340 (e.g., the first feedback signal 352, the second feedback signal 362, or both).

Figure 4:
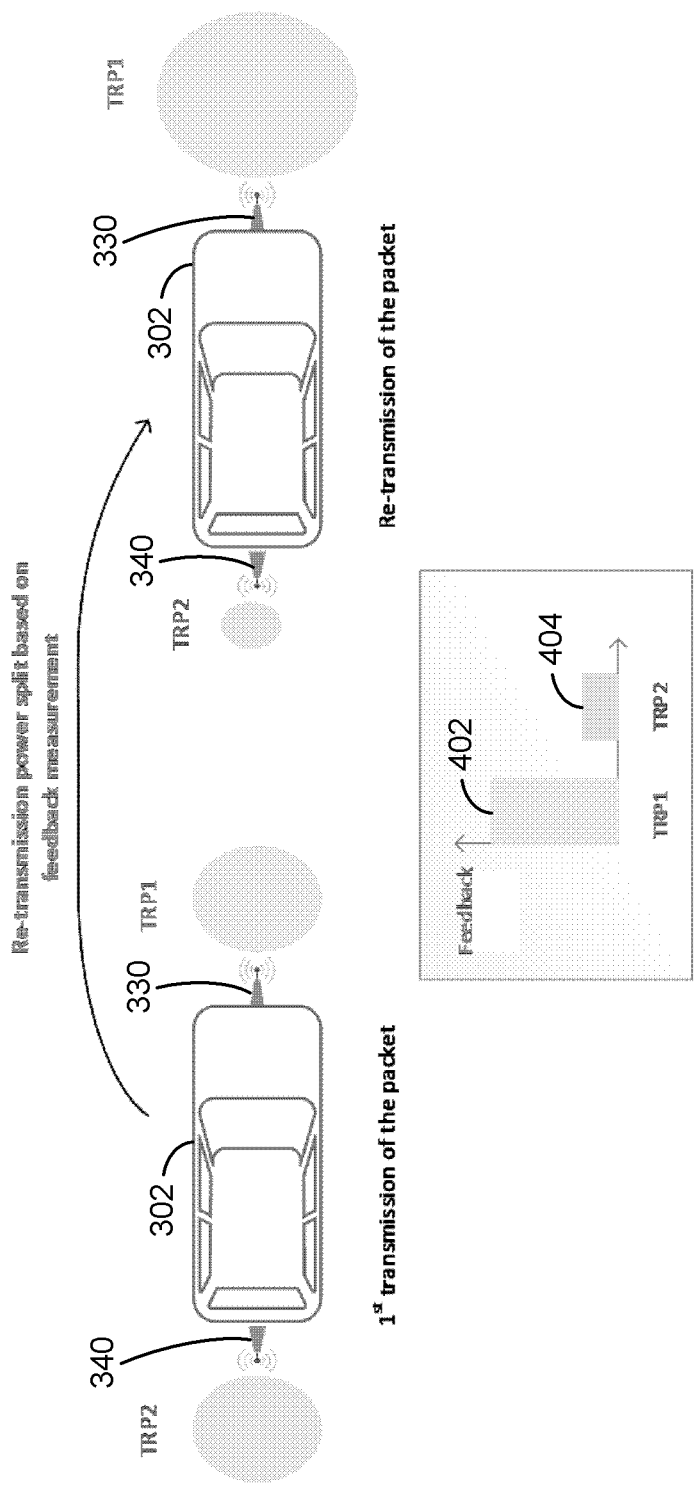
FIG. 4 is a diagram illustrating an example of transmit power adjustment in accordance with some aspects of the disclosure.

To further illustrate, FIG. 4 illustrates an example of transmit power adjustment in accordance with some aspects of the disclosure. In the example of FIG. 4, a magnitude 402 of received signal strength measured by the first TRP 330 may be greater than a magnitude 404 of received signal strength measured by the first TRP 330. In some examples, the magnitude 402 corresponds to a magnitude of the first received signal strength 326, and the magnitude 404 corresponds to a magnitude of the second received signal strength 328.

In some examples, the magnitudes 402, 404 indicate received signal strengths of feedback signals from multiple packet receiver devices, such as the feedback signals 352, 362 from the devices 350, 360. In one example, the magnitude 402 indicates a first aggregate received signal strength of one or more signals received by the first TRP 330 (e.g., the first feedback signal 352, the second feedback signal 362, or both), and the magnitude 404 indicates a second aggregate received signal strength of one or more signals received by the second TRP 340 (e.g., the first feedback signal 352, the second feedback signal 362, or both). In some examples, the magnitude 402 may be different than (e.g., greater than) the magnitude 404, such as due to differences in physical locations of the TRPs 330, 340, differences in physical locations of the devices 350, 360, differences in directions associated with the feedback signals 352, 362, differences in path loss characteristics associated with TRP-to-device links between the TRPs 330, 340 and the devices 350, 360, or a combination thereof.

In some wireless communication protocols (such as wireless communication protocols that use a power control technique), the greater magnitude 402 may indicate that devices experience difficulty receiving signals from the vehicle 302 (e.g., due to a path loss associated with one or more obstacles) and therefore increase power of transmitted feedback signals (e.g., to overcome the path loss). Further, the lesser magnitude 404 may indicate that other transmitting devices experience less difficulty receiving signals from the vehicle 302 (and therefore avoid increasing transmit power or reduce transmit power of transmitted feedback signals). The vehicle 302 may determine the second transmit power allocation 324 to compensate for such an effect, such as by increasing an amount of power allocated to the first TRP 330, by decreasing an amount of power allocated to the second TRP 340, or both, as illustrated in the example of FIG. 4.

Referring again to FIG. 3, depending on the particular implementation, the received signal strengths 326, 328 may include one more signal strength characteristics or metrics. In one example, the first received signal strength 326 corresponds to a first reference signal strength indicator (RSSI) of the first feedback signal 352, and the second received signal strength 328 corresponds to a second RSSI of the second feedback signal 362. In another example, the first received signal strength 326 corresponds to a first reference signal received power (RSRP) of the first feedback signal 352, and the second received signal strength 328 corresponds to a second RSRP of the second feedback signal 362.

In some examples, the vehicle 302 may adjust the first transmit power allocation 322 (e.g., based on the first received signal strength 326, the second received signal strength 328, or both) to determine the second transmit power allocation 324. In some examples, adjusting the first transmit power allocation 322 includes increasing a first amount of power associated with the first TRP 330 based on the second received signal strength 328 exceeding the first received signal strength 326, decreasing a second amount of power associated with the second TRP 340 based on the second received signal strength exceeding the first received signal strength 326, or both.

The vehicle 302 may perform a second wireless transmission 380 based on the second transmit power allocation 324. The vehicle 302 may perform the second wireless transmission 380 using multiple TRPs, such as the TRPs 330, 340. In some examples, the vehicle 302 performs the second wireless transmission 380 via a sidelink of a vehicle-to-vehicle wireless communications network. In some examples, the second wireless transmission 380 includes or corresponds to a retransmission of the first wireless transmission 370 (e.g., in response to one or both of the receive statuses 354, 364 indicating a NACK). In some other examples, the second wireless transmission 380 includes data that is different than data included in the first wireless transmission 370 (e.g., in response to one or both of the receive statuses 354, 364 indicating an ACK).

The examples described herein are applicable to a variety of wireless communication protocols, such as wireless communication protocols that use NACK-only feedback (without using ACK-based feedback), wireless communication protocols that use both ACK-based and NACK-based feedback, wireless communication protocols that do not use power control techniques, and wireless communication protocols that use power control techniques.

To illustrate, in an example of a wireless communication protocol that uses NACK-only feedback without power control, one or both of the feedback signals 352, 362 may include a NACK (e.g., a hybrid automatic repeat request (HARQ) NACK) of the first wireless transmission 370. The vehicle 302 may determine a receive power allocation 329 of one or both of the feedback signals 352, 362 among the plurality of TRPs 330, 340. The vehicle 302 may adjust the first transmit power allocation 322 inverse-proportionally to the receive power allocation 329 to determine the second transmit power allocation 324. In some implementations, increasing a transmit power allocation inverse-proportionally to a received signal strength may compensate for a path loss characteristic of a communication channel of the wireless communication system 300.

In an example of a wireless communication protocol that uses NACK-only feedback with power control, one or both of the feedback signals 352, 362 may include a NACK (e.g., a HARQ NACK) of the first wireless transmission 370. The vehicle 302 may determine a receive power allocation 329 of one or both of the feedback signals 352, 362 among the plurality of TRPs 330, 340. The vehicle 302 may adjust the first transmit power allocation 322 proportionally to the receive power allocation 329 to determine the second transmit power allocation 324. To further illustrate, the example illustrated in FIG. 4 may correspond to an example a wireless communication protocol that uses NACK-only feedback with power control.

In an example of a wireless communication protocol that uses ACK-based and NACK-based feedback without power control, one or both of the feedback signals 352, 362 may include a HARQ ACK of the first wireless transmission 370 or a HARQ NACK of the first wireless transmission 370. The vehicle 302 may determine a receive power allocation 329 of one or both of the feedback signals 352, 362 among the plurality of TRPs 330, 340. The vehicle 302 may adjust the first transmit power allocation 322 inverse-proportionally to the receive power allocation 329 to determine the second transmit power allocation 324.

In an example of a wireless communication protocol that uses ACK-based and NACK-based feedback with power control, one or both of the feedback signals 352, 362 may include a HARQ ACK of the first wireless transmission 370 or a HARQ NACK of the first wireless transmission 370. The vehicle 302 may determine a receive power allocation 329 of one or both of the feedback signals 352, 362 among the plurality of TRPs 330, 340. The vehicle 302 may adjust the first transmit power allocation 322 inverse-proportionally to the receive power allocation 329 to determine the second transmit power allocation 324 (e.g., by increasing power allocated to a TRP receiving a NACK).

In some examples, the vehicle 302 may be communication with devices using common frequency resources to transmit NACK feedback signals, which may be referred to as same frequency NACKs (SFNs). In some cases, a first device transmitting an SFN may be relatively near to the vehicle 302, and a second device transmitting an SFN may be relatively far from the vehicle 302. The vehicle 302 may adjust a transmit power allocation based on the SFNs (e.g., by decreasing transmit power allocated in the direction of the first device, by increasing transmit power allocated in the direction of the second device, or both).

In some implementations, a power transmit power allocation among TRPs of the vehicle 302 can be selected or adjusted using one or more precoders. To illustrate, in some examples, the TRPs 330, 340 each include a plurality of precoders 334. In an illustrative example, the vehicle 302 performs the first wireless transmission 370 using a first set 336 of precoders of the plurality of precoders 334. The vehicle 302 may select, from among the plurality of precoders 334, a second set 346 of precoders for the second wireless transmission 380. As a non-limiting example, the first set 336 of precoders may enable the first wireless transmission 370 to have an approximately balanced transmit power distribution among the TRPs 330, 340, and the second set 346 of precoders may increase transmit power allocated to the first TRP 330 or may decrease transmit power allocated to the second TRP 340, such as illustrated in the example of FIG. 4.

In some examples, the first wireless transmission 370 may include sidelink control information (SCI) 372. The SCI 372 can include information related to the first wireless transmission 370, information related to the second wireless transmission 380, or both. To illustrate, the SCI 372 may indicate the first set 336 of precoders, the second set 346 of precoders, or both.

In some examples, the SCI 372 indicates a first transmission configuration indicator (TCI) state 374 associated with the vehicle 302. The first TCI state 374 may correspond to a particular transmission state used to perform the first wireless transmission 370. The SCI 372 may further indicate a reservation 376 of one or more time-frequency resources (e.g., for the second wireless transmission 380, for one or more other subsequent wireless transmissions, or a combination thereof).

In some examples, the reservation 376 is "blind" of feedback received by the vehicle 302 in response to the first wireless transmission 370. To illustrate, the reservation 376 may reserve the one or more time-frequency resources for a retransmission of the first wireless transmission 370, and the vehicle 302 may perform the retransmission independently of one or more feedback signals, such as the first feedback signal 352, the second feedback signal 362, or both. In some other examples, the reservation 376 may reserve the one or more time-frequency resources for a transmission that is distinct from the first wireless transmission 370, such as for a wireless transmission of a packet that is not included in the first wireless transmission 370.

The SCI 372 may optionally indicate one or more second TCI states 378. In some examples, the one or more TCI states 378 may correspond to the one or more time-frequency resources identified by the reservation 376 and may be associated with the second wireless transmission 380. The second TCI states 378 may correspond to or include a particular TCI state that the vehicle 302 is to use for the second wireless transmission 380 (which may be the same as or different than the first TCI state 374). Thus, in some examples, the first wireless transmission 370 identifies (e.g., via the SCI 372) one or more TCI states to be used for the second wireless transmission 380.

In some other examples, a TCI state to be used for the second wireless transmission 380 may be undetermined at the time of performing the first wireless transmission 370 (such as if the vehicle 302 is to determine the TCI state of the second wireless transmission 380 based on one or more feedback signals received in response to the first wireless transmission 370). In this case, the SCI 372 may indicate that the one or more second TCI states 378 are to be subsequently determined or that the one or more second TCI states 378 are to be subsequently determined based on the one or more feedback signals.

In some other implementations, the SCI 372 may indicate a set of candidate TCI states corresponding to the one or more time-frequency resources identified by the reservation 376 and for the second wireless transmission 380. To illustrate, the set of candidate TCI states may include a first TCI state corresponding to an approximately equal allocation of transmit power among the TRPs 330, 340, a second TCI state allocating more transmit power to the second TRP 340 than to the first TRP 330, and a third TCI state allocating more transmit power to the first TRP 330 than to the second TRP 340. The vehicle 302 may select, after transmitting the SCI 372, a particular candidate TCI state from among the set of candidate TCI states.

To illustrate, in one example, the vehicle 302 selects, from among the set of candidate TCI states, the first candidate TCI state corresponding to the first TCI state 374 for the second wireless transmission 380 (e.g., to maintain the first transmit power allocation 322 for the second wireless transmission 380, such as if the first received signal strength 326 is approximately equal to the second received signal strength 328). In another example, the vehicle 302 selects, from among the set of candidate TCI states, the second candidate TCI state for the second wireless transmission based on the first received signal strength 326 exceeding the second received signal strength 328 (e.g., to increase transmit power allocated to the second TRP 340). In an additional example, the vehicle 302 selects, from among the set of candidate TCI states, the third candidate TCI state for the second wireless transmission based on the first received signal strength 326 being less than the second received signal strength 328 (e.g., to increase transmit power allocated to the first TRP 330).

In some implementations, the vehicle 302 maintains a transmit power allocation history 314. In some examples, the transmit power allocation history 314 is stored at the memory 310. In some other examples, the transmit power allocation history 314 may be stored externally to the vehicle 302, such as at a cloud server, as an illustrative example. The vehicle 302 may update the transmit power allocation history 314 based on transmit power allocations determined during operation of the vehicle 302, such as based on the first transmit power allocation 322, the second transmit power allocation 324, or both. To further illustrate, in some examples, the first transmit power allocation 322 corresponds to a biased power allocation that is selected based on the transmit power allocation history 314.

In some examples, the transmit power allocation history 314 may be accessed (or indexed) based on geographical locations. For example, a particular city, street, or other geographic location may be associated with certain wireless fading characteristics, such as if a first side of a particular street is associated with obstacles (e.g., buildings, barricades, or other obstructions) and if a second side of the street is relatively clear of obstacles. In this example, the vehicle 302 may determine, based on the transmit power allocation history 314, to increase (e.g., positively bias) transmit power toward the first side, to decrease (e.g., negatively bias) transmit power associated with the second side, or both.

Alternatively or in addition, the transmit power allocation history 314 may be accessed (or indexed) based on other information, such as date or time information. As an example, certain times of day (e.g., rush hour) may be associated with certain wireless fading characteristics, such as increased noise or interference due to increased vehicle traffic, increased wireless communications, or both. In some examples, the vehicle 302 may determine, based on the transmit power allocation history 314, to increase (e.g., positively bias) transmit power during one time of day (e.g., rush hour), to decrease (e.g., negatively bias) transmit power during another time of day (e.g., nighttime), or both.

One or more aspects of FIGS. 3 and 4 may improve performance of a wireless communication system 300. To illustrate, in one example, the first wireless transmission 370 is performed based on the first TCI state 374 and indicates the reservation 376, the second wireless transmission 380 may be performed while the reservation 376 is valid and based on a TCI state different than the first TCI state 374 (e.g., based on one of the second TCI states 378). Thus, by determining a received signal strength based on a feedback signal, the second transmit power allocation 324 can be changed relative to the first transmit power allocation 322 without waiting until expiration of the reservation 376. Accordingly, transmit signal coverage associated with the vehicle 302 can be improved.

FIG. 5 is a flow chart of an illustrative example of a method 500 of wireless communication according to some aspects of the disclosure. In some implementations, the method 500 is performed by a vehicle, such as by the vehicle 302 of FIG. 3.

The method 500 includes performing a first wireless transmission using a plurality of TRPs of a vehicle, at 502. The first wireless transmission is performed based on a first transmit power allocation among the plurality of TRPs. For example, the vehicle 302 may perform the first wireless transmission 370 using the TRPs 330, 340 and based on the first transmit power allocation 322.

The method 500 further includes, in response to the first wireless transmission, receiving one or more feedback signals indicating a receive status of the first wireless transmission at one or more devices, at 504. For example, the vehicle 302 may receive the first feedback signal 352 indicating the receive status 354 (e.g., an ACK or a NACK indicating whether the device 350 has successfully received and decoded the first wireless transmission 370). Alternatively or in addition, the vehicle 302 may receive the second feedback signal 362 indicating the receive status 364 (e.g., an ACK or a NACK indicating whether the device 360 has successfully received and decoded the first wireless transmission 370).

The method 500 further includes performing a second wireless transmission using the plurality of TRPs based on a second transmit power allocation among the plurality of TRPs, at 506. The second transmit power allocation is determined based on at least one received signal strength of the one or more feedback signals. For example, the vehicle 302 may perform the second wireless transmission 380 based on the second transmit power allocation 324.

FIG. 6 is a flow chart of another method 600 of wireless communication according to some aspects of the disclosure. In some aspects, the method 600 is performed by a device in communication with the vehicle 302, such as by the device 350 or by the device 360, as illustrative examples.

The method 600 includes receiving, by a device, a first wireless transmission performed by a plurality of TRPs of a vehicle based on a first transmit power allocation among the plurality of TRPs. For example, the device 350 or the device 360 may receive the first wireless transmission 370 from the vehicle 302. The vehicle 302 may transmit the first wireless transmission 370 using the TRPs 330, 340 and based on the first transmit power allocation 322.

The method 600 further includes, in response to the first wireless transmission, transmitting a feedback signal indicating a receive status of the first wireless transmission at the device, at 604. For example, the device 350 may transmit the first feedback signal 352 indicating the receive status 354. As another device, the device 360 may transmit the second feedback signal 362 indicating the receive status 364.

The method 600 further includes receiving, by the device, a second wireless transmission performed by the plurality of TRPs based on a second transmit power allocation among the plurality of TRPs, at 606. The second transmit power allocation is based on a received signal strength of the feedback signal. To illustrate, the device 350 or device 360 may receive the second wireless transmission 380. The vehicle 302 may perform the second wireless transmission 380 using the TRPs 330, 340 and based on the second transmit power allocation 324.

Figure 7:
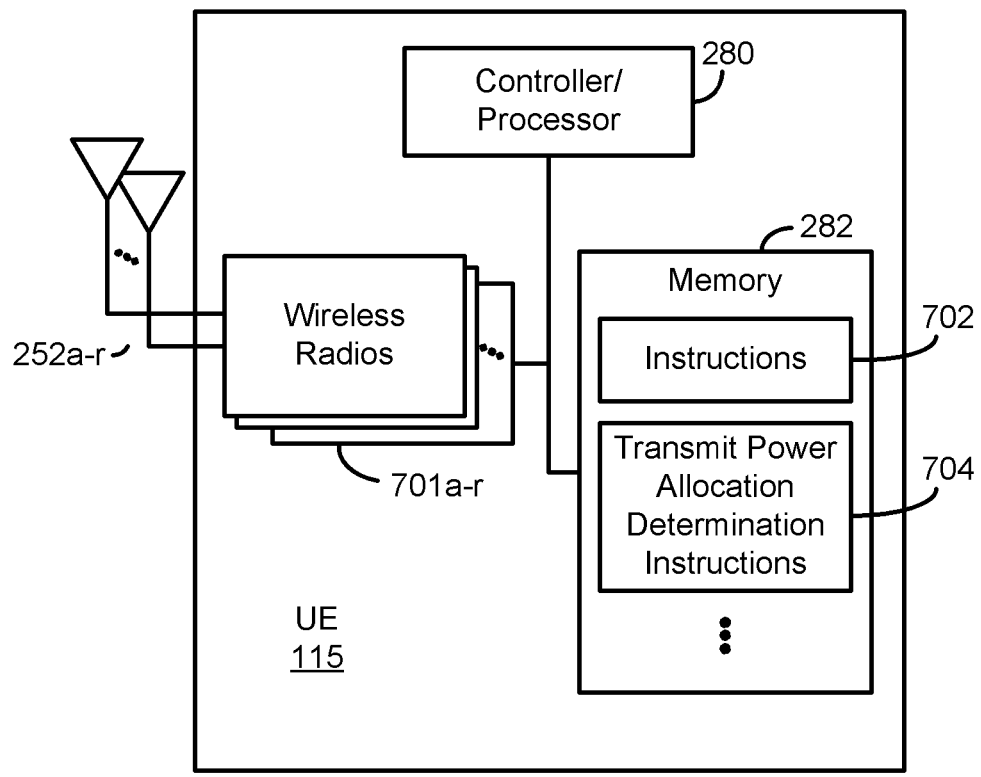
FIG. 7 is a block diagram illustrating an example of a UE according to some aspects of the disclosure.

FIG. 7 is a block diagram illustrating an example of a UE 115 according to some aspects of the disclosure. The UE 115 may include the processor 280 and the memory 282. The processor 280 may execute instructions 702 (e.g., the instructions 312) stored in the memory 282 to initiate, perform, or control one or more operations described herein. The processor 280 may execute the instructions 702 to transmit and receive signals via wireless radios 701a-r and the antennas 252a-r. The wireless radios 701a-r may include hardware or other components corresponding to one or more features described with reference to FIG. 2, such as the modulator/demodulators 254a-r, the MIMO detector 256, the receive processor 258, the transmit processor 264, the TX MIMO processor 266, one or more other components, or a combination thereof. In some examples, the processor 280 executes transmit power allocation determination instructions 704 to determine one or more transmit power allocations, such as the first transmit power allocation 322, the second transmit power allocation 324, one or more other transmit power allocations, or a combination thereof.

In a first aspect, a method of wireless communication includes performing a first wireless transmission using a plurality of TRPs of a vehicle. The first wireless transmission is performed based on a first transmit power allocation among the plurality of TRPs. The method further includes, in response to the first wireless transmission, receiving one or more feedback signals indicating a receive status of the first wireless transmission at one or more devices. The method further includes performing a second wireless transmission using the plurality of TRPs based on a second transmit power allocation among the plurality of TRPs. The second transmit power allocation is determined based on at least one received signal strength of the one or more feedback signals.

In a second aspect, alone or in combination with the first aspect, the method further includes determining a first received signal strength associated with a first TRP of the plurality of TRPs, the at least one received signal strength including the first received signal strength; determining a second received signal strength associated with a second TRP of the plurality of TRPs, the at least one received signal strength further including the second received signal strength; and adjusting the first transmit power allocation based on the first received signal strength and the second received signal strength to determine the second transmit power allocation.

In a third aspect, alone or in combination with one or more of the first through second aspects, adjusting the first transmit power allocation includes increasing a first amount of power associated with the first TRP based on the second received signal strength exceeding the first received signal strength, decreasing a second amount of power associated with the second TRP based on the second received signal strength exceeding the first received signal strength, or both.

In a fourth aspect, alone or in combination with one or more of the first through third aspects, the first received signal strength corresponds to a first RSSI of the first feedback signal, and the second received signal strength corresponds to a second RSSI of the second feedback signal.

In a fifth aspect, alone or in combination with one or more of the first through fourth aspects, the first received signal strength corresponds to a first RSRP of the first feedback signal, and the second received signal strength corresponds to a second RSRP of the second feedback signal.

In a sixth aspect, alone or in combination with one or more of the first through fifth aspects, the one or more feedback signals include a HARQ NACK of the first wireless transmission, and the method further includes: determining a receive power allocation of the one or more feedback signals among the plurality of TRPs; and adjusting the first transmit power allocation inverse-proportionally to the receive power allocation to determine the second transmit power allocation.

In a seventh aspect, alone or in combination with one or more of the first through sixth aspects, the one or more feedback signals include a HARQ NACK of the first wireless transmission, and the method further includes: determining a receive power allocation of the one or more feedback signals among the plurality of TRPs; and adjusting the first transmit power allocation proportionally to the receive power allocation to determine the second transmit power allocation.

In an eighth aspect, alone or in combination with one or more of the first through seventh aspects, the one or more feedback signals include one or more of a HARQ ACK of the first wireless transmission or a HARQ NACK of the first wireless transmission, and the method further includes determining a receive power allocation of the one or more feedback signals among the plurality of TRPs; and adjusting the first transmit power allocation inverse-proportionally to the receive power allocation to determine the second transmit power allocation.

In a ninth aspect, the one or more feedback signals include one or more of a HARQ ACK of the first wireless transmission or a HARQ NACK of the first wireless transmission, and the method further includes: determining a receive power allocation of the one or more feedback signals among the plurality of TRPs; and adjusting the first transmit power allocation inverse-proportionally to the receive power allocation to determine the second transmit power allocation.

In a tenth aspect, alone or in combination with one or more of the first through ninth aspects, the one or more devices are included in or correspond to a second vehicle, and the first wireless transmission and the second wireless transmission are performed via a sidelink of a vehicle-to-vehicle wireless communications network.

In an eleventh aspect, alone or in combination with one or more of the first through tenth aspects, a first TRP of the plurality of TRPs is positioned at a first region of the vehicle, and wherein a second TRP of the plurality of TRPs is positioned at a second region of the vehicle that is different than the first region.

In a twelfth aspect, alone or in combination with one or more of the first through eleventh aspects, the first region corresponds to one of a front of the vehicle, a back of the vehicle, a driver side of the vehicle, or a passenger side of the vehicle, and the second region corresponds to another of the front of the vehicle, the back of the vehicle, the driver side of the vehicle, or the passenger side of the vehicle.

In a thirteenth aspect, alone or in combination with one or more of the first through twelfth aspects, the first wireless transmission includes SCI indicating a first TCI state associated with the vehicle and further indicating a reservation of one or more time-frequency resources.

In a fourteenth aspect, alone or in combination with one or more of the first through thirteenth aspects, the reservation is for a retransmission of the first wireless transmission, and the method further includes performing the retransmission independently of the one or more feedback signals.

In a fifteenth aspect, alone or in combination with one or more of the first through fourteenth aspects, the one or more time-frequency resources are for a wireless transmission of a packet that is not included in the first wireless transmission.

In a sixteenth aspect, alone or in combination with one or more of the first through fifteenth aspects, the SCI further indicates one or more second TCI states of the vehicle corresponding to the one or more time-frequency resources, and the one or more second TCI states are associated with the second wireless transmission.

In a seventeenth aspect, alone or in combination with one or more of the first through sixteenth aspects, the SCI further indicates that one or more second TCI states of the vehicle are to be subsequently determined or that the one or more second TCI states are to be subsequently determined based on the one or more feedback signals.

In an eighteenth aspect, alone or in combination with one or more of the first through seventeenth aspects, the SCI further indicates a set of candidate TCI states of the vehicle corresponding to the one or more time-frequency resources and for the second wireless transmission.

In a nineteenth aspect, alone or in combination with one or more of the first through eighteenth aspects, the method further includes, after transmitting the SCI, selecting, from among the set of candidate TCI states, a first candidate TCI state corresponding to the first TCI state for the second wireless transmission.

In a twentieth aspect, alone or in combination with one or more of the first through nineteenth aspects, the method further includes, after transmitting the SCI, selecting, from among the set of candidate TCI states, a second candidate TCI state for the second wireless transmission based on a first received signal strength of a first feedback signal of the one or more feedback signals exceeding a second received signal strength of a second feedback signal of the one or more feedback signals.

In a twenty-first aspect, alone or in combination with one or more of the first through twentieth aspects, the method further includes, after transmitting the SCI, selecting, from among the set of candidate TCI states, a third candidate TCI state for the second wireless transmission based on a first received signal strength of a first feedback signal of the one or more feedback signals being less than a second received signal strength of a second feedback signal of the one or more feedback signals.

In a twenty-second aspect, alone or in combination with one or more of the first through twenty-first aspects, the first wireless transmission is performed using a first set of precoders included in a plurality of precoders of the vehicle, and the method further includes selecting, from among the plurality of precoders, a second set of precoders for the second wireless transmission.

In a twenty-third aspect, alone or in combination with one or more of the first through twenty-second aspects, the first wireless transmission is performed further using a first antenna or antenna panel of the vehicle, and the second wireless transmission is performed further using a second antenna or antenna panel of the vehicle.

In a twenty-fourth aspect, alone or in combination with one or more of the first through twenty-third aspects, the first transmit power allocation corresponds to a balanced transmit power allocation among the plurality of TRPs.

In a twenty-fifth aspect, alone or in combination with one or more of the first through twenty-fourth aspects, the first transmit power allocation corresponds to a biased power allocation that is selected based on a transmit power allocation history associated with the vehicle.

In a twenty-sixth aspect, alone or in combination with one or more of the first through twenty-fifth aspects, the first wireless transmission is performed based on a first TCI state and indicates a reservation of one or more time-frequency resources, and the second wireless transmission is performed while the reservation is valid, based on a second TCI state different than the first TCI state, and using the one or more time-frequency resources.

In a twenty-seventh aspect, an apparatus includes a memory and one or more processors coupled to the memory. The one or more processors are configured to perform a first wireless transmission using a plurality of TRPs of a vehicle based on a first transmit power allocation among the plurality of TRPs. The one or more processors are further configured to receive, in response to the first wireless transmission, one or more feedback signals indicating a receive status of the first wireless transmission at one or more devices. The one or more processors are further configured to perform a second wireless transmission using the plurality of TRPs based on a second transmit power allocation among the plurality of TRPs. The second transmit power allocation is determined based on at least one received signal strength of the one or more feedback signals.

In a twenty-eighth aspect, an apparatus includes means for performing a first wireless transmission using a plurality of TRPs of a vehicle. The first wireless transmission is performed based on a first transmit power allocation among the plurality of TRPs. The apparatus further includes means for receiving, in response to the first wireless transmission, one or more feedback signals indicating a receive status of the first wireless transmission at one or more devices. The apparatus further includes means for performing a second wireless transmission using the plurality of TRPs based on a second transmit power allocation among the plurality of TRPs, wherein the second transmit power allocation is determined based on at least one received signal strength of the one or more feedback signals.

In a twenty-ninth aspect, a non-transitory computer-readable medium stores instructions executable by a processor to perform operations. The operations include performing a first wireless transmission using a plurality of TRPs of a vehicle. The first wireless transmission is performed based on a first transmit power allocation among the plurality of TRPs. The operations further include, in response to the first wireless transmission, receiving one or more feedback signals indicating a receive status of the first wireless transmission at one or more devices. The operations further include performing a second wireless transmission using the plurality of TRPs based on a second transmit power allocation among the plurality of TRPs. The second transmit power allocation is determined based on at least one received signal strength of the one or more feedback signals.

In a thirtieth aspect, a method of wireless communication includes receiving, by a device, a first wireless transmission performed by a plurality of TRPs of a vehicle based on a first transmit power allocation among the plurality of TRPs. The method further includes, in response to the first wireless transmission, transmitting a feedback signal indicating a receive status of the first wireless transmission at the device. The method further includes receiving, by the device, a second wireless transmission performed by the plurality of TRPs based on a second transmit power allocation among the plurality of TRPs. The second transmit power allocation is based on a received signal strength of the feedback signal.

In a thirty-first aspect, alone or in combination with the thirtieth aspect, the device is included in or corresponds to a second vehicle, and the first wireless transmission and the second wireless transmission are performed via a sidelink of a vehicle-to-vehicle wireless communications network.

In a thirty-second aspect, alone or in combination with one or more of the thirtieth through thirty-first aspects, the first wireless transmission includes SCI indicating a first TCI state associated with the vehicle and further indicating a reservation of one or more time-frequency resources.

In a thirty-third aspect, alone or in combination with one or more of the thirtieth through thirty-second aspects, the reservation is for a retransmission of the first wireless transmission, and the method further includes performing the retransmission independently of the one or more feedback signals.

In a thirty-fourth aspect, alone or in combination with one or more of the thirtieth through thirty-third aspects, the one or more time-frequency resources are for a wireless transmission of a packet that is not included in the first wireless transmission.

In a thirty-fifth aspect, alone or in combination with one or more of the thirtieth through thirty-fourth aspects, the SCI further indicates one or more second TCI states of the vehicle corresponding to the one or more time-frequency resources, and the one or more second TCI states are associated with the second wireless transmission.

In a thirty-sixth aspect, alone or in combination with one or more of the thirtieth through fifth aspects, the SCI further indicates that one or more second TCI states of the vehicle are to be subsequently determined or that the one or more second TCI states are to be subsequently determined based on the one or more feedback signals.

In a thirty-seventh aspect, alone or in combination with one or more of the thirtieth through thirty-sixth aspects, the SCI further indicates a set of candidate TCI states of the vehicle corresponding to the one or more time-frequency resources and for the second wireless transmission.

In a thirty-eighth aspect, alone or in combination with one or more of the thirtieth through thirty-seventh aspects, the first transmit power allocation corresponds to a balanced transmit power allocation among the plurality of TRPs.

In a thirty-ninth aspect, alone or in combination with one or more of the thirtieth through eighth aspects, the first transmit power allocation corresponds to a biased power allocation that is selected based on a transmit power allocation history associated with the vehicle.

In a fortieth aspect aspect, alone or in combination with one or more of the thirtieth through thirty-ninth aspects, the first wireless transmission is performed based on a TCI state and indicates a reservation of one or more time-frequency resources, and the second wireless transmission is performed while the reservation is valid, based on a second TCI state different than the first TCI state, and using the one or more time-frequency resources.

In a forty-first aspect, an apparatus includes a memory and one or more processors coupled to the memory. The one or more processors are configured to receive a first wireless transmission performed by a plurality of TRPs of a vehicle based on a first transmit power allocation among the plurality of TRPs. The one or more processors are further configured to transmit, in response to the first wireless transmission, a feedback signal indicating a receive status of the first wireless transmission. The one or more processors are further configured to receive a second wireless transmission performed by the plurality of TRPs based on a second transmit power allocation among the plurality of TRPs. The second transmit power allocation is based on a received signal strength of the feedback signal.

In forty-second aspect, an apparatus includes means for receiving a first wireless transmission performed by a plurality of TRPs of a vehicle based on a first transmit power allocation among the plurality of TRPs. The apparatus further includes means for transmitting, in response to the first wireless transmission, a feedback signal indicating a receive status of the first wireless transmission. The apparatus further includes means for receiving a second wireless transmission performed by the plurality of TRPs based on a second transmit power allocation among the plurality of TRPs. The second transmit power allocation is based on a received signal strength of the feedback signal.

In a forty-third aspect, a non-transitory computer-readable medium stores instructions executable by a processor to perform operations. The operations include receiving, by a device, a first wireless transmission performed by a plurality of TRPs of a vehicle based on a first transmit power allocation among the plurality of TRPs. The operations further include, in response to the first wireless transmission, transmitting a feedback signal indicating a receive status of the first wireless transmission at the device. The operations also include receiving, by the device, a second wireless transmission performed by the plurality of TRPs based on a second transmit power allocation among the plurality of TRPs. The second transmit power allocation is based on a received signal strength of the feedback signal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, one or more features described herein may be implemented via specialized processor circuitry, via executable instructions, and/or combinations thereof.

Those of skill would further appreciate that the various illustrative logical blocks, modules, circuits, and operations (e.g., the operations of FIGS. 5 and 6) described herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
performing a first wireless transmission using a plurality of transmission and reception points (TRPs) of a vehicle, wherein the first wireless transmission is performed based on a first transmit power allocation among the plurality of TRPs;
in response to the first wireless transmission, receiving one or more feedback signals indicating a receive status of the first wireless transmission at one or more devices; and
performing a second wireless transmission using the plurality of TRPs based on a second transmit power allocation among the plurality of TRPs, wherein the second transmit power allocation is determined based on at least one received signal strength of the one or more feedback signals.

2. The method of claim 1, further comprising:
determining a first received signal strength associated with a first TRP of the plurality of TRPs, the at least one received signal strength including the first received signal strength;
determining a second received signal strength associated with a second TRP of the plurality of TRPs, the at least one received signal strength further including the second received signal strength; and
adjusting the first transmit power allocation based on the first received signal strength and the second received signal strength to determine the second transmit power allocation.

3. The method of claim 2, wherein adjusting the first transmit power allocation includes increasing a first amount of power associated with the first TRP based on the second received signal strength exceeding the first received signal strength, decreasing a second amount of power associated with the second TRP based on the second received signal strength exceeding the first received signal strength, or both.

4. The method of claim 2, wherein the first received signal strength corresponds to a first reference signal strength indicator (RSSI) of a first feedback signal of the one or more feedback signals or a first reference signal received power (RSRP) of the first feedback signal, and wherein the second received signal strength corresponds to a second RSSI of a second feedback signal of the one or more feedback signals or a second RSRP of the second feedback signal.

5. The method of claim 1, wherein the one or more feedback signals include a hybrid automatic repeat request (HARQ) negative-acknowledgement (NACK) of the first wireless transmission, and further comprising:

determining a receive power allocation of the one or more feedback signals among the plurality of TRPs; and
adjusting the first transmit power allocation inverse-proportionally to the receive power allocation to determine the second transmit power allocation.

6. The method of claim 1, wherein the one or more feedback signals include a hybrid automatic repeat request (HARQ) negative-acknowledgement (NACK) of the first wireless transmission, and further comprising:
determining a receive power allocation of the one or more feedback signals among the plurality of TRPs; and
adjusting the first transmit power allocation proportionally to the receive power allocation to determine the second transmit power allocation.

7. The method of claim 1, wherein the one or more feedback signals include one or more of a hybrid automatic repeat request (HARQ) acknowledgement (ACK) of the first wireless transmission or a HARQ negative-acknowledgement (NACK) of the first wireless transmission, and further comprising:
determining a receive power allocation of the one or more feedback signals among the plurality of TRPs; and
adjusting the first transmit power allocation inverse-proportionally to the receive power allocation to determine the second transmit power allocation.

8. The method of claim 1, wherein the one or more feedback signals include one or more of a hybrid automatic repeat request (HARQ) acknowledgement (ACK) of the first wireless transmission or a HARQ negative-acknowledgement (NACK) of the first wireless transmission, and further comprising:
determining a receive power allocation of the one or more feedback signals among the plurality of TRPs; and
adjusting the first transmit power allocation inverse-proportionally to the receive power allocation to determine the second transmit power allocation.

9. The method of claim 1, wherein the one or more devices are included in or correspond to a second vehicle, and wherein the first wireless transmission and the second wireless transmission are performed via a sidelink of a vehicle-to-vehicle wireless communications network.

10. An apparatus comprising:
a memory; and
one or more processors coupled to the memory and configured to:
perform a first wireless transmission using a plurality of transmission and reception points (TRPs) of a vehicle based on a first transmit power allocation among the plurality of TRPs;
in response to the first wireless transmission, receive one or more feedback signals indicating a receive status of the first wireless transmission at one or more devices; and
perform a second wireless transmission using the plurality of TRPs based on a second transmit power allocation among the plurality of TRPs, wherein the second transmit power allocation is determined based on at least one received signal strength of the one or more feedback signals.

11. The apparatus of claim 10, wherein a first TRP of the plurality of TRPs is positioned at a first region of the vehicle, wherein a second TRP of the plurality of TRPs is positioned at a second region of the vehicle that is different than the first region, wherein the first region corresponds to one of a front of the vehicle, a back of the vehicle, a driver side of the vehicle, or a passenger side of the vehicle, and wherein the second region corresponds to another of the front of the vehicle, the back of the vehicle, the driver side of the vehicle, or the passenger side of the vehicle.

12. The apparatus of claim 10, wherein the first wireless transmission includes sidelink control information (SCI) indicating a first transmission configuration indicator (TCI) state associated with the vehicle and further indicating a reservation of one or more time-frequency resources.

13. The apparatus of claim 12, wherein the reservation is for a retransmission of the first wireless transmission, and wherein the one or more processors are further configured to perform the retransmission independently of the one or more feedback signals.

14. The apparatus of claim 12, wherein the one or more time-frequency resources are for a wireless transmission of a packet that is not included in the first wireless transmission.

15. The apparatus of claim 12, wherein the SCI further indicates one or more second TCI states of the vehicle corresponding to the one or more time-frequency resources, and wherein the one or more second TCI states are associated with the second wireless transmission.

16. The apparatus of claim 12, wherein the SCI further indicates that one or more second TCI states of the vehicle are to be subsequently determined or that the one or more second TCI states are to be subsequently determined based on the one or more feedback signals.

17. The apparatus of claim 12, wherein the SCI further indicates a set of candidate TCI states of the vehicle corresponding to the one or more time-frequency resources and for the second wireless transmission.

18. The apparatus of claim 17, wherein the one or more processors are further configured to select, after transmitting the SCI, from among the set of candidate TCI states, a first candidate TCI state corresponding to the first TCI state for the second wireless transmission.

19. The apparatus of claim 17, wherein the one or more processors are further configured to perform one of:
after transmitting the SCI, select, from among the set of candidate TCI states, a second candidate TCI state for the second wireless transmission based on a first received signal strength of a first feedback signal of the one or more feedback signals exceeding a second received signal strength of a second feedback signal of the one or more feedback signals; or
after transmitting the SCI, select, from among the set of candidate TCI states, a third candidate TCI state for the second wireless transmission based on the first received signal strength being less than the second received signal strength.

20. The apparatus of claim 10, further comprising a plurality of precoders of the vehicle, wherein the one or more processors are further configured to select, from among the plurality of precoders, a first set of precoders for the first wireless transmission, and wherein the one or more processors are further configured to select, from among the plurality of precoders, a second set of precoders for the second wireless transmission.

21. The apparatus of claim 10, further comprising:
a first antenna or first antenna panel of the vehicle configured to perform the first wireless transmission; and
a second antenna or second antenna panel of the vehicle configured to perform the second wireless transmission.

22. The apparatus of claim 10, wherein the first transmit power allocation corresponds to a balanced transmit power allocation among the plurality of TRPs.

23. The apparatus of claim 10, wherein the first transmit power allocation corresponds to a biased power allocation that is selected based on a transmit power allocation history associated with the vehicle.

24. The apparatus of claim 10, wherein the first wireless transmission is performed based on a first transmission configuration indicator (TCI) state and indicates a reservation of one or more time-frequency resources, and wherein the second wireless transmission is performed while the reservation is valid, based on a second TCI state different than the first TCI state, and using the one or more time-frequency resources.

25. An apparatus comprising:
means for performing a first wireless transmission using a plurality of transmission and reception points (TRPs) of a vehicle, wherein the first wireless transmission is performed based on a first transmit power allocation among the plurality of TRPs;
means for receiving, in response to the first wireless transmission, one or more feedback signals indicating a receive status of the first wireless transmission at one or more devices; and
means for performing a second wireless transmission using the plurality of TRPs based on a second transmit power allocation among the plurality of TRPs, wherein the second transmit power allocation is determined based on at least one received signal strength of the one or more feedback signals.

26. A method of wireless communication, comprising:
receiving, by a device, a first wireless transmission performed by a plurality of transmission and reception points (TRPs) of a vehicle based on a first transmit power allocation among the plurality of TRPs;
in response to the first wireless transmission, transmitting a feedback signal indicating a receive status of the first wireless transmission at the device; and
receiving, by the device, a second wireless transmission performed by the plurality of TRPs based on a second transmit power allocation among the plurality of TRPs, wherein the second transmit power allocation is based on a received signal strength of the feedback signal.

27. The method of claim 26, wherein the device is included in or corresponds to a second vehicle, and wherein the first wireless transmission and the second wireless transmission are performed via a sidelink of a vehicle-to-vehicle wireless communications network.

28. The method of claim 26, wherein the first wireless transmission includes sidelink control information (SCI) indicating a first transmission configuration indicator (TCI) state associated with the vehicle and further indicating a reservation of one or more time-frequency resources.

29. The method of claim 28, wherein the reservation is for a retransmission of the first wireless transmission, and further comprising performing the retransmission independently of the feedback signal.

30. The method of claim 28, wherein the one or more time-frequency resources are for a wireless transmission of a packet that is not included in the first wireless transmission.

31. The method of claim 28, wherein the SCI further indicates one or more second TCI states of the vehicle corresponding to the one or more time-frequency resources, and wherein the one or more second TCI states are associated with the second wireless transmission.

32. The method of claim 28, wherein the SCI further indicates that one or more second TCI states of the vehicle are to be subsequently determined or that the one or more second TCI states are to be subsequently determined based on the feedback signal.

33. The method of claim 28, wherein the SCI further indicates a set of candidate TCI states of the vehicle corresponding to the one or more time-frequency resources and for the second wireless transmission.

34. The method of claim 26, wherein the first transmit power allocation corresponds to a balanced transmit power allocation among the plurality of TRPs.

35. An apparatus comprising:
a memory; and
one or more processors coupled to the memory and configured to:
receive a first wireless transmission performed by a plurality of transmission and reception points (TRPs) of a vehicle based on a first transmit power allocation among the plurality of TRPs;
in response to the first wireless transmission, transmit a feedback signal indicating a receive status of the first wireless transmission; and
receive a second wireless transmission performed by the plurality of TRPs based on a second transmit power allocation among the plurality of TRPs, wherein the second transmit power allocation is based on a received signal strength of the feedback signal.

* * * * *